US005559285A

United States Patent [19]
Bryant et al.

[11] Patent Number: 5,559,285
[45] Date of Patent: Sep. 24, 1996

[54] FUZZY LOGIC METHOD FOR DETECTING MISFIERS IN INTERNAL COMBUSTION ENGINES

[75] Inventors: Bruce D. Bryant, Royal Oak; Kenneth A. Marko, Ann Arbor; John V. James, Walled Lake, all of Mich.

[73] Assignee: Ford Motor Company, Dearborn, Mich.

[21] Appl. No.: 349,580

[22] Filed: Dec. 5, 1994

[51] Int. Cl.⁶ .................................................. G01M 15/00
[52] U.S. Cl. ............................................. 73/117.3; 123/419
[58] Field of Search .................................. 73/116, 117.3; 123/419, 436; 364/431.07, 431.08

[56] References Cited

U.S. PATENT DOCUMENTS

| | | |
|---|---|---|
| 3,924,457 | 12/1975 | Oshima et al. . |
| 3,983,754 | 10/1976 | Deguchi et al. . |
| 4,302,814 | 11/1981 | Full et al. ........................ 364/431.01 |
| 4,700,563 | 10/1987 | Iwata et al. . |
| 4,892,075 | 1/1990 | Iriyama et al. ........................ 73/117.3 |
| 5,044,195 | 9/1991 | James et al. ........................ 73/117.3 |
| 5,060,279 | 10/1991 | Crawford et al. . |
| 5,109,695 | 5/1992 | James et al. ........................ 73/117.3 |
| 5,116,259 | 5/1992 | Demizu et al. ........................ 73/118.3 |
| 5,127,262 | 7/1992 | Demizu et al ........................ 73/117.3 |
| 5,193,513 | 3/1993 | Marko et al. ........................ 73/117.3 |
| 5,201,293 | 4/1993 | Langner et al. . |
| 5,214,958 | 6/1993 | Inada et al. ........................ 73/117.3 |
| 5,231,869 | 8/1993 | Klenk et al. . |
| 5,263,453 | 11/1993 | Wakahara et al. ........................ 73/117.3 |
| 5,359,883 | 11/1994 | Baldwin et al. ........................ 73/117.3 |
| 5,361,628 | 11/1994 | Marko et al. ........................ 73/116 |

FOREIGN PATENT DOCUMENTS

| | | |
|---|---|---|
| 0484691A2 | 10/1991 | Germany . |
| 4204845A1 | 8/1992 | Germany . |
| WO92-11522 | 7/1992 | WIPO . |

*Primary Examiner*—Richard Chilcot
*Assistant Examiner*—Eric S. McCall
*Attorney, Agent, or Firm*—Mark Mollon

[57] ABSTRACT

Misfiring of individual cylinders in an internal combustion engine 70 is detected based on simultaneous use of two or more different methods of misfire detection which examine different combustion-related parameters of engine operation, such as crankshaft acceleration and exhaust gas pressure. An analyzer 76 produces a final misfire determination $M_f(i)$ based on the simultaneously obtained misfire determinations in order to provide greater coverage of the speed-load range of engine 70 and to provide increased confidence and accuracy in calling misfires in the portion of the speed-load range where both misfire methods are presumed to function.

10 Claims, 4 Drawing Sheets

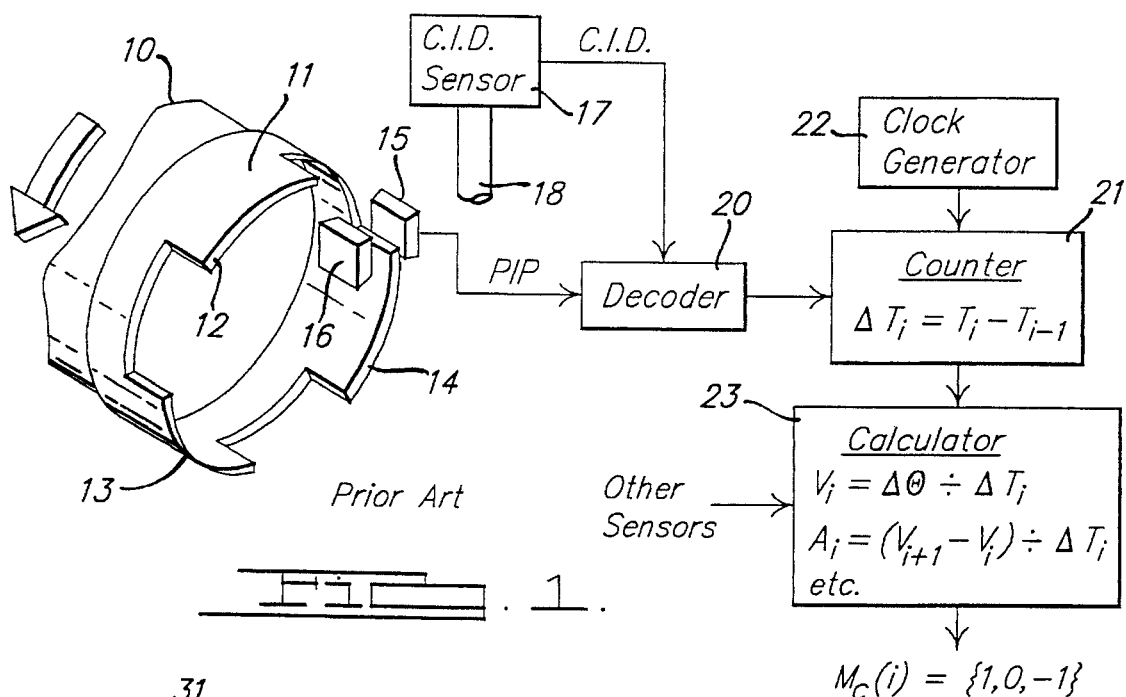
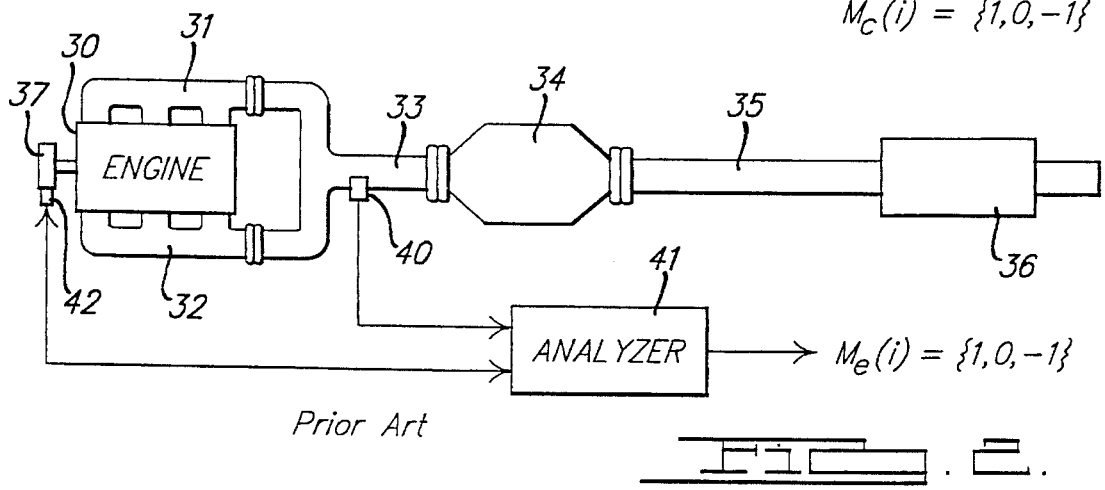
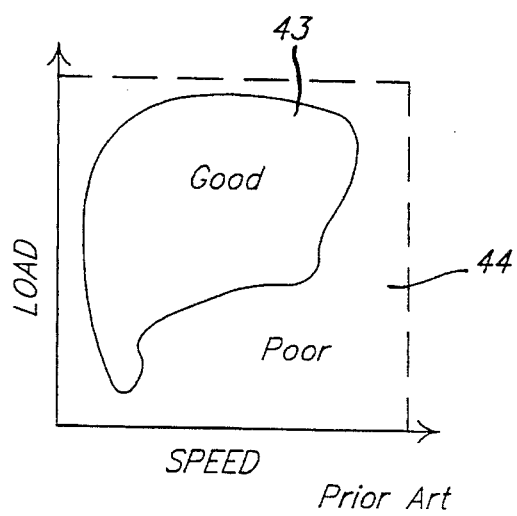
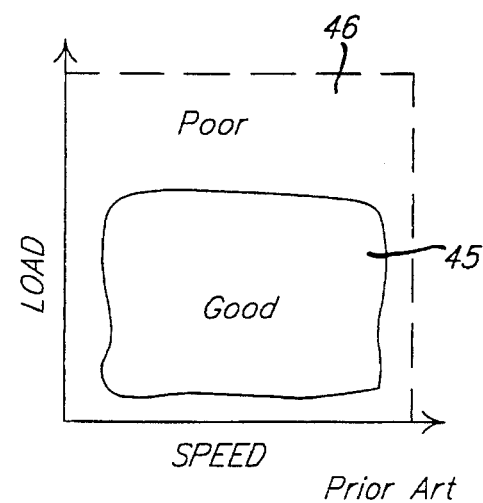

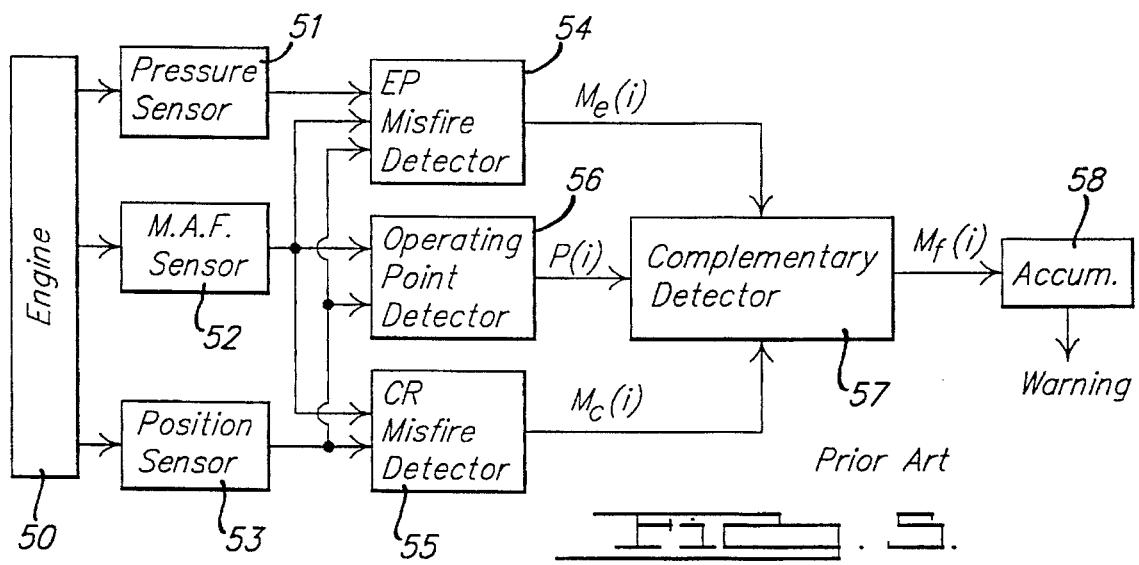
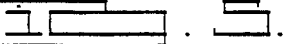
FIG. 5.
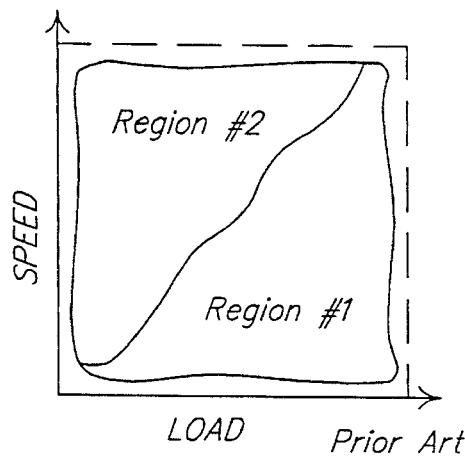
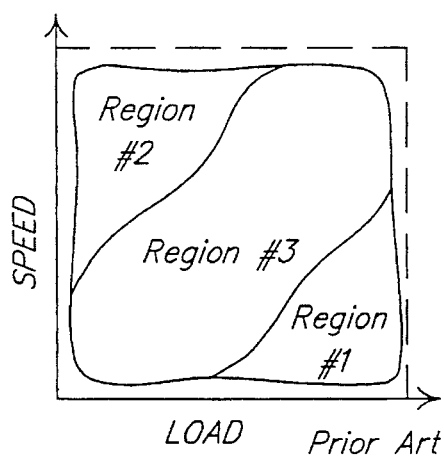
Prior Art
FIG. 6.
Prior Art
FIG. 7.
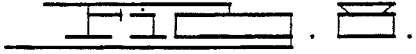
Prior Art
FIG. 8.

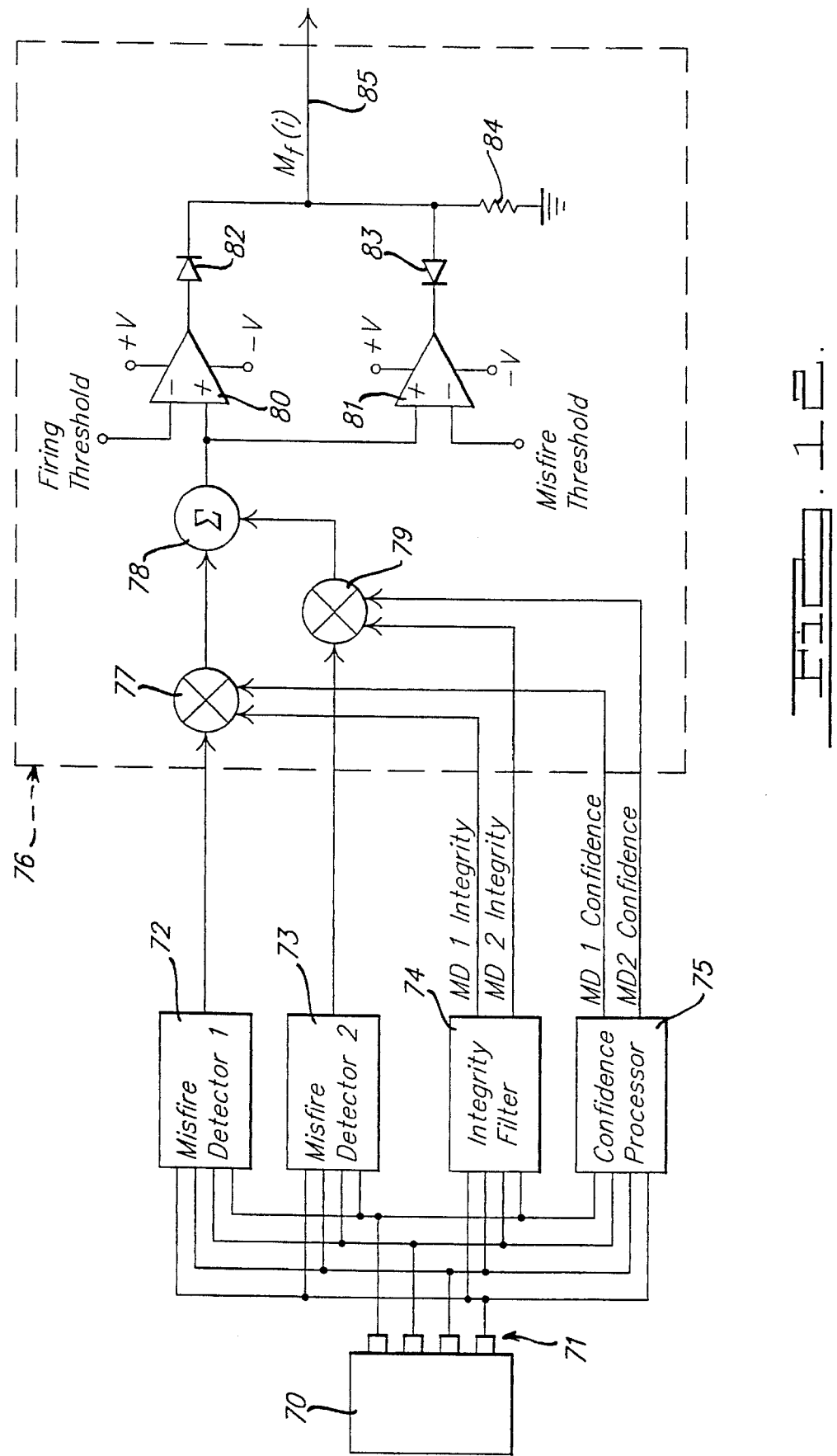

FUZZY LOGIC METHOD FOR DETECTING MISFIERS IN INTERNAL COMBUSTION ENGINES

BACKGROUND OF THE INVENTION

This application is related to commonly assigned, copending U.S. application Ser. No. 07/956,229, entitled "Complementary Method for Detecting Misfires in Internal Combustion Engines", filed Oct. 5, 1992.

The present invention relates in general to detecting misfires occurring during normal in-use vehicle operation of internal combustion engines, and more specifically to identifying the occurrence of individual misfires in each engine cylinder.

Catalytic converters are used in automobiles to reduce the amount of pollutants in the engine exhaust. When a cylinder misfires so that no combustion or incomplete combustion occurs, uncombusted fuel is introduced into the exhaust which then burns in the hot catalytic converter. The added heat from fuel burning in the catalytic converter tends to destroy the catalyst. Thus, it is desirable to detect and count engine misfires and signal the operator of the vehicle upon occurrence of excessive misfires so that steps may be taken to protect the catalytic converter.

Various methods have been employed in the prior art to detect misfires, such as monitoring of engine crankshaft accelerations, monitoring of electrical properties of the ignition spark and monitoring of various properties of the exhaust gas, including exhaust gas pressure and exhaust gas temperature.

Each prior art technique has certain advantages and limitations. Specifically, prior art techniques have suffered from inadequate coverage of the entire speed-load range of an in-use vehicle engine. Furthermore, the confidence in any detection of a misfire in a cylinder varies depending upon numerous factors, such as signal-to-noise ratio and processing limitations.

To improve misfire detection accuracy and to reduce the occurrence of false indications of misfire (i.e., false alarms), it is known to use multiple misfire detectors operating simultaneously using different detection techniques such that coverage of the speed-load range increases. Prior attempts to combine multiple detection techniques, however, have defined certain regions within the speed-load map of an engine in which each respective misfire detection technique is taken as valid (i.e., will be used in the determination of misfire) and other regions where it is taken as invalid (and is not used in the determination of misfire). In other words, the signal-to-noise ratio of measurements made by a particular misfire technique are treated as though they are constant throughout the entire valid region. However, since the signal-to-noise ratio does in fact vary within the valid region, inaccuracies are introduced into the misfire determination.

SUMMARY OF THE INVENTION

As an advantage of the present invention, coverage of the speed-load range of an engine is increased and confidence in detection of misfire is improved using a misfire method whereby independently derived misfire detection signals are weighted according to their confidence and integrity and are then combined to produce a single final misfire determination for each cylinder firing. Thus, an apparatus for monitoring misfires in an internal combustion engine comprises a first detector sensing a first combustion-related parameter of the engine and producing a first misfire determination for each individual cylinder event. The first misfire determination has a first confidence variable which is determined according to an instantaneous operating point within an engine operating area. A second detector senses a second combustion-related parameter of the engine and produces a second misfire determination for each individual cylinder event. The second misfire determination has a second confidence variable which is determined according to an instantaneous operating point within an engine operating area. A sensor senses an instantaneous operating point within the engine operating area. An analyzer coupled to the first detector, the second detector, and the sensor weights the first and second misfire determinations according to the respective first and second confidence variables to produce first and second weighted misfire determinations. The weighted misfire determinations are summed and the sum is compared with a threshold to produce a final misfire determination. The first combustion-related parameter may be crankshaft acceleration and the second combustion-related parameter may be exhaust gas pressure, for example.

BRIEF DESCRIPTION OF THE DRAWINGS

The novel features of the invention are set forth with particularity in the appended claims. The invention itself, however, both as to its organization and method of operation together with further objects and advantages thereof, may best be understood by reference to the following description taken in conjunction with the accompanying drawings in which:

FIG. 1 illustrates components and processing employed in a crankshaft acceleration misfire detector.

FIG. 2 is a block diagram showing misfire detection using exhaust gas pressure.

FIG. 3 divides the speed-load range of an engine into regions of good and poor signal-to-noise ratio obtained by a crankshaft acceleration misfire detector.

FIG. 4 divides the speed-load range of an engine into regions of good and poor signal-to-noise ratio obtained by an exhaust pressure misfire detector.

FIG. 5 is a block diagram showing a preferred embodiment of the complementary misfire detector of the present invention.

FIG. 6 shows the speed-load range of an engine divided into regions wherein one or another of a misfire detection technique has best performance.

FIG. 7 shows another embodiment including a third region wherein both misfire detection techniques provide acceptable accuracy.

FIG. 8 is a decision matrix for obtaining a complementary misfire detection result from independently generated misfire detection signals.

FIG. 12 is a schematic, block diagram showing a preferred embodiment.

DETAILED DESCRIPTION OF PREFERRED EMBODIMENTS

Figure 9:
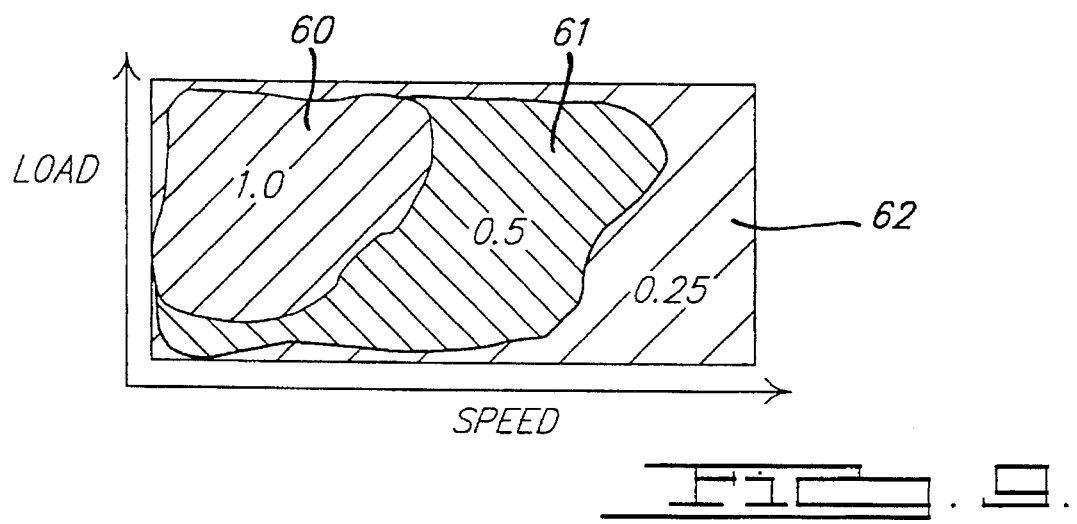
FIG. 9 illustrates a confidence map for a misfire detection technique.

The present invention employs independently derived misfire detection signals from at least two independent misfire detection techniques, and the independent misfire detection signals are combined in a complementary fashion to increase confidence in the accuracy of misfire detection and to increase the speed-load range coverage for misfire detection. In a preferred embodiment, one independent misfire technique is provided by crankshaft acceleration detection as shown in FIG. 1 and exhaust gas pressure detection as shown in FIG. 2. Each misfire determination from each technique is included in the final misfire determination in proportion to the confidence level in that technique at the engine speed-load point where the corresponding measurement was obtained.

The crankshaft acceleration method for detecting misfires is based on position detection of the crankshaft, measuring time intervals between selected crankshaft positions, calculation of acceleration, and additional processing in order to classify each cylinder event as a misfire or a proper firing. As shown in FIG. 1, a wheel 11 is mounted on a crankshaft 10 of an internal combustion engine. Wheel 11 includes vanes 12, 13, and 14 which pass between a hall sensor 15 and a permanent magnet 16 during rotation of the crankshaft to generate a profile ignition pulse (PIP) signal to identify crankshaft position. Vanes 12–14 are typically arranged to generate a rising PIP signal from the hall sensor just before top dead center of each respective cylinder (e.g., 10° before TDC). A rising PIP signal actually indicates the approach to top dead center of two engine cylinders, one of which is on a power stroke and another of which is on an intake stroke. Crankshaft position can alternatively be detected using a variable reluctance (VR) sensor and a multitoothed wheel, as is known in the art.

A cylinder identification (CID) sensor 17 is connected to a camshaft 18 of the engine for identifying which of the two cylinders is actually on its power stroke. Since camshaft 18 rotates once for every two rotations of crankshaft 10, a CID signal is generated having a rising edge corresponding to a known position relative to top dead center in the power stroke of a predetermined cylinder, e.g., cylinder No. 1.

A decoder receives the PIP signal and the CID signal and provides reference marker signals to a counter 21. A clock signal is provided to counter 21 from a clock generator 22. An elapsed time signal $\Delta T_i$ is determined by counter 21, which is provided to a calculator 23 which derives a corresponding velocity measure $V_i$ and an acceleration measurement $A_i$. Calculator 23 is connected to other sensors and performs other calculations to produce a misfire determination $M_c(i)$ having a value of 1 to indicate a normal or proper firing of the cylinder, 0 to indicate a "no-call" (i.e., when a reliable result cannot be determined), and −1 to indicate a misfire. A crankshaft acceleration method for detecting misfire is further described in U.S. Pat. No. 5,044,195 and U.S. Pat. No. 5,109,695, both incorporated herein by reference.

This invention incorporates a second type of misfire detection, such as the prior art technique of monitoring engine exhaust pressure as shown in FIG. 2. An internal combustion engine 30 includes a right hand exhaust manifold 31 and a left hand exhaust manifold 32 joined to an exhaust conduit 33. Exhaust gases from engine 30 flow through manifolds 31 and 32 and conduit 33 to a catalytic converter 34, a conduit 35 and a muffler 36. Engine 30 drives an output shaft 37, such as a crankshaft or a camshaft. A pressure transducer 40 is in communication with the exhaust manifold via exhaust conduit 33, as shown. An analog pressure signal from transducer 40 is coupled to an analyzer 41 including an analog-to-digital converter (not shown). In response to position signals from a position generator 42, analyzer 41 produces formatted digitized pressure data which is used to identify individual cylinder misfires. Analyzer 41 preferably implements a data classifier (i.e., a pattern recognition system preferably using a neural network simulation program) to produce a misfire recognition signal $M_e(i)$ having a value of 1 to indicate a normal or proper firing of the cylinder, 0 to indicate a "no-call" and −1 to indicate a misfire. Further details of a system of the type shown in FIG. 2 are provided in U.S. Pat. No. 5,193,513, which is incorporated herein by reference.

Various techniques of misfire detection have their own respective limitations and reliability depending upon various engine parameters. For example, a crankshaft acceleration method as shown in FIG. 1 may have an overall performance as shown in FIG. 3. Over the speed/load operating range of the internal combustion engine, the crankshaft acceleration misfire detector provides good accuracy over a region 43 (which is less than the full speed-load range of the engine). A region 44 corresponds to speed-load operating points where the crankshaft acceleration technique of misfire detection exhibits relatively poor accuracy. It has been shown that in the crankshaft acceleration method, accuracy tends to be poorer at high speeds and/or low load conditions.

FIG. 4 shows performance of a typical exhaust pressure misfire detector as shown in FIG. 2. A region 45 of good accuracy is more uniform over the speed-load range of the engine but may include an area of poor accuracy at region 46, for example. The two misfire detection techniques are complementary in the sense that the sum of good regions 43 and 45 include more of the full speed-load range of the engine than either good region alone. The crankshaft acceleration method has best performance at medium speeds and loads, while the exhaust pressure method has best performance at high speeds and loads (because there is a higher pressure difference between firing and misfiring cylinders at high speed and load). Furthermore, the two techniques can be used simultaneously to reduce errors occurring in the overlap area of good regions 43 and 45. This is especially important when detecting individual misfire events because with the large number of cylinder firings occurring during a vehicle lifetime, even a very low error rate may still result in a large number of incorrect misfire determinations.

In addition to speed and load parameters, the operating condition of an engine can be represented using various parameters, such as exhaust gas recirculation valve position, spark advance, and transmission gear. It may be desirable in some instances to define engine operating areas using these additional parameters, however, the most significant parameters are speed and load. Therefore, the preferred embodiment is described below using two-dimensional speed-load operating areas.

One embodiment of a complementary misfire detector according to the present invention is shown in FIG. 5. A multi-cylinder engine 50 is associated with a plurality of engine sensors, such as a pressure sensor 51, a mass air flow (MAF) sensor 52, and a position sensor 53, preferably comprising a crankshaft and a camshaft sensor to produce PIP and CID signals. A first misfire detector is shown as an exhaust pressure (EP) misfire detector 54 which receives input signals from sensors 51–53. A second misfits detector is shown as a crankshaft (CR) misfire detector 55 which receives input signals from MAF sensor 52 and position sensor 53. An operating point detector 56 receives input signals from MAF sensor 52 and position sensor 53 and generates an instantaneous operating point output signal P(i). A complementary detector 57 receives a first misfire determination $M_e(i)$ from EP misfits detector 54, a second misfire determination $M_c(i)$ from CR misfire detector 55, and instantaneous operating point P(i) from operating point detector 56. A final misfire determination $M_f(i)$ is provided from complementary detector 57 to an accumulator 58 which generates a warning signal whenever final misfire determination $M_f(i)$ indicates excessive misfires (as determined by an average misfiring rate).

In operation, EP misfire detector 54 forms a misfire determination for each individual cylinder firing based upon pressure data for an engine cycle from pressure sensor 51 and position data from position sensor 53. EP misfire detector 54 further employs engine load information from MAF sensor 52 to determine whether engine 50 is operating at a load condition wherein misfire detection by pressure sensing is unreliable and a no-call (i.e., "0") should be generated in first misfire determination $M_e(i)$. CR misfire detector 55 determines crankshaft acceleration using position data from position sensor 53 and normalizes the acceleration by expected engine torque using engine load information from MAF sensor 52. CR misfire detector 55 may generate a no-call in second misfire determination $M_c(i)$ based on measured noise in position signals or based on engine load and RPM.

Operating point detector 56 determines in which of several regions of the speed-load range of the engine the engine is currently operating. As shown in FIG. 6, the operating point detector employs a speed-load map including at least two regions, a region #1 wherein the accuracy rate of CR misfire detector 55 is best and a region #2 wherein the accuracy rate of EP misfire detector 54 is best. Instantaneous operating point signal P(i) has a value of 1 to indicate that the instantaneous operating point is within region #1 and has a value of 2 to indicate that the instantaneous operating point is located in region #2. Regions #1 and #2 are predetermined depending upon the expected performance of EP misfire detector 54 and CR misfire detector 55. In one embodiment for predefining the locations covered by region #1 and region #2, the signal-to-noise ratios of each misfire detector are compared at each point within the speed-load range of the engine and the corresponding operating point falls to region #1 or #2 depending on which signal-to-noise ratio is highest. As shown in FIGS. 3 and 4, crankshaft acceleration misfire detection provides better accuracy at high load and exhaust pressure misfire detection provides better accuracy at high speeds. Therefore, FIG. 6 provides a region #1 corresponding to higher loads and a region #2 corresponding to higher speeds. When instantaneous operating point signal P(i) has a value of 1, complementary detector 57 produces a final misfire determination $M_f(i)$ equal to the crankshaft misfire determination $M_c(i)$. Likewise, when P(i) has a value of 2, $M_f(i)$ is equal to $M_e(i)$.

As shown in FIG. 7, a third region #3 can also be employed wherein the accuracy rates of both misfire detectors are acceptable and both misfire determinations are examined to produce the final misfire determination. Thus, operating point detector 56 provides an output P(i) equal to 3 when the instantaneous operating point falls within region #3 wherein both misfire detectors produce good accuracy. Complementary detector 57 then employs a decision matrix such as shown in FIG. 8 to generate a final misfire determination. If $M_c(i)$ is equal to $M_e(i)$, i.e., both are 1, 0, or −1, then $M_f(i)$ has the same value. If one of the misfire determinations has a value of 0 (indicating a no-call from that misfire detector), then the final misfire determination equals the misfire determination that did not equal 0. If one misfire determination indicates a misfire (i.e., equals −1) while the other misfire determination indicates a proper firing (i.e., equals 1) then complementary detector 57 must arbitrate between the two determinations. In the preferred embodiment, a method A is employed wherein the final misfire determination equals 1 to indicate a proper firing in the case of a disagreement between the first and second misfire determinations. Since it is an object of the present invention to provide low error rate, method A is preferred since the error rate in the final misfire determination becomes the product of the error rates of the separate detection techniques thereby providing a greatly reduced false alarm rate, i.e, the error rate in cylinder firings which are finally determined to be a misfire. However, in some applications it may be most important to catch all misfires (i.e., have a low error rate in the determinations of proper firings) in which case a method B would be employed wherein the final misfire determination indicates a misfire in the event of a disagreement between the first and second misfire determinations.

A disadvantage of the complementary misfire detection system shown in FIGS. 3–8 is that each separate misfire detection technique is treated as though it were equally good at determining misfires everywhere in its region of validity. In fact, the actual confidence in any misfire determination varies within a region of validity. Thus, in the preferred embodiment of the present invention each separate misfire determination from each separate technique is included in the final misfire determination in proportion to the confidence level in that technique at the engine speed-load point where the corresponding measurement was obtained. In other words, rather than merely defining a single region of validity, the preferred embodiment utilizes separate regions of varying confidence level between no confidence and complete confidence, thereby greatly improving accuracy and signal-to-noise ratio of the final misfire determination.

Figure 10:
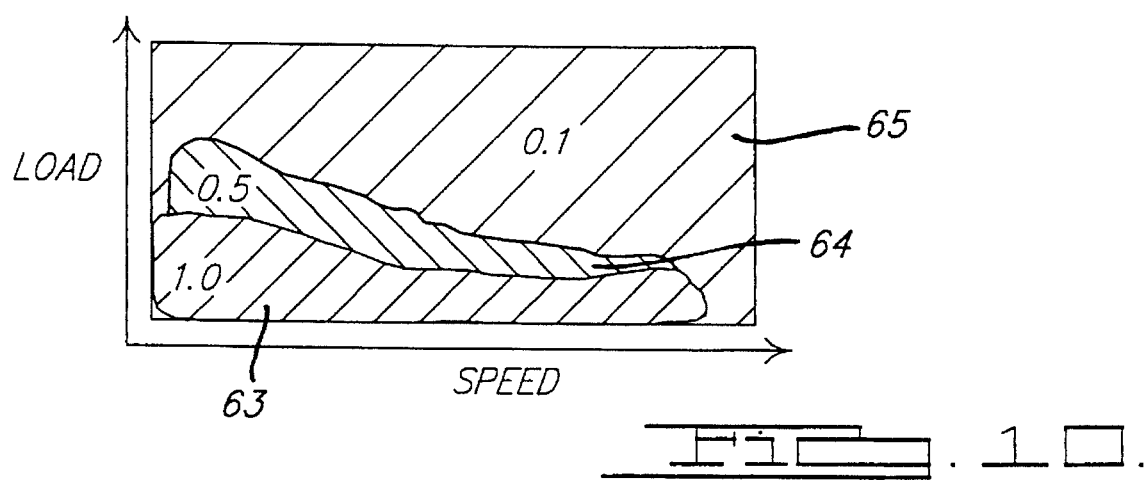
FIG. 10 illustrates another confidence map for another misfire detection technique.

Confidence level may preferably be expressed as a scalar number between 0 and 1, inclusive, or as a percent. FIG. 9 shows an example of confidence levels for a first misfire detection method including a region 60 where accuracy of the misfire detection technique provides full 100% confidence, a region 61 with 50% confidence, and a region 62 with 25% confidence. FIG. 10 shows confidence levels for a second misfire detection technique including a region 63 of full confidence, a region 64 of 50% confidence, and a region 65 of 10% confidence. The regions of FIGS. 9 and 10 can alternatively be represented using a table or map to store confidence levels corresponding to each point in the speed-load range using any desired resolution (i.e., distance between points on the map and/or step size between consecutive confidence levels stored in the map).

To facilitate the combination of misfire detection outputs from separate misfire detectors, the preferred embodiment of the present invention utilizes a scalar number representation of misfire detector outputs having at least three values for uniquely identifying either a misfire, a "no call", or a proper firing, respectively. The scalar value for a "no call" is preferably intermediate the other two values. In a preferred embodiment, for example, −1 represents a misfire, 0 represents a no call, and +1 represents a proper firing. A combined output CO for cylinder event i, where i is an index variable, is determined according to the following formula:

$$CO(i) = M_1(i) * C_1(i) + M_2(i) * C_2(i)$$

where $M_1$ and $M_2$ are the outputs from first and second misfire detectors, respectively, and $C_1$ and $C_2$ are associated confidence variables for the first and second misfire detectors, respectively. If more than two misfire detector techniques are employed, then the combined output is given by:

$$CO(i) = \sum_{j=1}^{n} M_j(i) * C_j(i)$$

where n misfire detectors are being used concurrently and where $M_j$ is the detection output from the jth misfire detector and $C_j$ is the respective confidence level.

Figure 11:
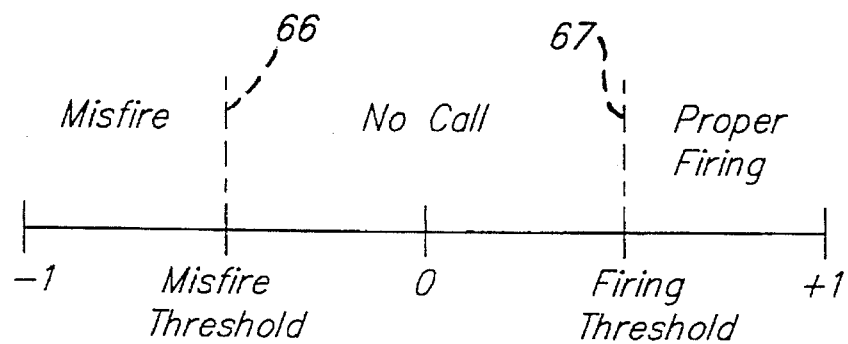
FIG. 11 shows a scalar relationship between a misfire threshold and a proper firing threshold used in a preferred embodiment.

Based on combined output CO, a final misfire call is made according to the magnitude of CO as a sum of all the misfire detector outputs multiplied by their respective confidence levels. A certain negative value for CO will indicate a misfire, while a certain positive value of CO will indicate a proper firing. Low values of CO (either positive or negative) around zero indicate either (1) conflicting results in which case the outputs of different misfire detectors cancel each other, or (2) weak results from all misfire detectors. For the final misfire determination, a scalar output is formed where −1 represents a misfire, 0 represents a "no call", and +1 represents a proper firing. The value of CO is compared to a misfire threshold 66 and a firing threshold 67 as shown in FIG. 11. If the value of CO is less than or equal to misfire threshold 66 then the final misfire determination $M_f(i)$ equals −1 to indicate a misfire. If CO is greater than or equal to firing threshold 67, then $M_f(i)$ is equal to +1 to indicate a proper firing. Otherwise, the final determination $M_f$ equals zero to indicate a "no call". The misfire and firing thresholds can be determined in accordance with the desired misfire detection accuracy and an acceptable false alarm rate. The misfire and firing thresholds could also be equal, in which case there would not be a "no call" region.

The final misfire determination is expressed as follows:

If $CO(i) \geq FT$, then $M_f(i)=1$, else

If $CO(i) \leq MT$, then $M_f(i)=-1$, else $M_f(i)=0$.

where FT is the firing threshold and MT is the misfire threshold. If different scalar numbers are adopted to represent a misfire, a proper firing, or a "no call", then the values shown above would also be similarly adjusted.

As a further improvement to the accuracy of misfire detection, the present invention employs another fuzzy variable called "integrity" which is represented by a variable I having a value from 0 to 1, inclusive, for each misfire detector. Integrity I reflects the quality of recent measurements from which the misfire detectors output are based. Use of the integrity variable adds sensitivity in the misfire determination to any perceived local deficiencies in the misfire measurements of a particular detector. For example, the value of integrity can be based upon instantaneous signal-to-noise ratio or the observed presence of external or other affects that are not accounted for in the misfire detection strategy. Integrity variable I has a value of zero if some external influence completely negates the validity of any particular misfire detection output. Integrity I has a value of one if no such external affects are present or if the actual integrity is impossible to assess. For external affects of intermediate impact upon integrity, Integrity I is assigned a value between 0 and 1.

One example of an integrity variable is a "bump filter" as described in U.S. Pat. No. 5,109,695, where operation of a misfire detector is temporarily suspended upon detection of noisy misfire detector data which could be caused by a vehicle driving over a large bump. The bump causes vibrations of the crankshaft and corrupts the data being collected to perform misfire detection. When a bump is detected, Integrity I would be assigned a value of zero. Alternatively, the magnitude of a bump could be used to determine a value of I between 0 and 1.

Integrity I is used to further weight each misfire detection output as follows:

$$CO(i) = \sum_{j=1}^{n} M_j(i) * C_j(i) * I_j(i)$$

The resulting combined output CO is then compared with the misfire threshold and firing threshold as described above.

FIG. 12 illustrates an apparatus for performing the fuzzy logic method of the present invention for combining concurrent misfire determinations. An engine 70 is monitored by a plurality of engine sensors 71 providing engine operating parameters to a first misfire detector 72, a second misfire detector 73, an integrity filter 74, and a confidence processor 75. First misfire detector 72 provides a misfire output to one input of a multiplier 77 in an analyzer 76. The misfire output from second misfire detector 73 is coupled to one input of a multiplier 79. Based on an engine operating point from sensors 71, confidence processor 75 calculates a misfire detector #1 confidence value which is coupled to a second input of multiplier 77. It also calculates a misfire detector #2 confidence value which is coupled to a second input of multiplier 79. Integrity filter 74 provides a misfire detector #1 integrity value to multiplier 77 and a misfire detector #2 integrity value to multiplier 79. As described above, these integrity values are determined to quantify the instantaneous quality of the sensor data. The outputs of multipliers 77 and 79 are coupled to summing inputs of a summer 78.

The output from summer 78 generates a signal proportional to the value of CO as given above. The summer signal is provided to the noninverting input of a comparator 80 and the noninverting input of a comparator 81. A voltage equal to the firing threshold FT is provided to the inverting input of comparator 80 and a voltage equal to the misfire threshold MT is coupled to the inverting input of comparator 81. Comparators 80 and 81 are provided with positive and negative supply voltages +V and −V.

A diode 82 has its anode connected to the output of comparator 80 and its cathode connected to an analyzer output 85 for providing final misfire determination $M_f(i)$. A diode 83 has its cathode connected to the output of comparator 81 and its anode connected to output 85. Output 85 is coupled to ground through a pull-down resistor 84.

In the operation of this preferred embodiment, first and second misfire detectors 72 and 73 generate detector signals having a positive voltage to indicate a proper firing and a negative voltage to indicate a misfire. Integrity filter 74 and confidence processor 75 output weighting factors according to the integrity and confidence of the misfire detectors at each instantaneous operating point of engine 70 when the detector signals are generated. The output of summer 78 has a positive, negative or zero value based on the confidence and integrity weighting factors. Output 85 of analyzer 76 assumes one of three voltage levels depending upon the action of comparators 80 and 81 and diodes 82 and 83. Thus, when the output of summer 78 is greater than the firing threshold, comparator 80 drives output 85 to a positive voltage +V through diode 82. When the output of summer 78 is below the value of the misfire threshold, then comparator 81 drives output 85 to a negative voltage −V through diode 83. Otherwise, the outputs of comparators 80 and 81 are blocked by diodes 82 and 83, respectively, and output 85 is tied to ground through pull-down resistor 84.

In one alternative embodiment, rather than comparing a combined output with predetermined thresholds, each separate misfire detector contributes a dimension to an N-dimensional geometric space within a programmed computer, where N equals the number of misfired detectors being deployed. The space comprises an orthogonal N-dimensional cartesian coordinate space where the individual misfire detection outputs are plotted. Prior to plotting, the individual misfire results are scaled by their respective confidence and integrity values. In order to make a final misfire determination, the final position within the coordinate space is determined. Regions are identified within the coordinate space corresponding to a proper firing, a misfire, or a "no call". The locations within the various regions can be determined by a trainable classifier using a neural network, for example.

In yet another alternative embodiment, each individual misfire detector may generate a detector output with a continuous value between −1 and +1, thereby taking the confidence level of the measurement into account prior to coupling the output to the analyzer. The individual misfire detector outputs can then be plotted in a coordinate space. Alternatively, the continuous-valued detector outputs can be summed and the sum compared to the misfire and firing thresholds as described above. Although the invention has been described using two different misfire detectors, additional improvements in accuracy of detection can be realized by including more than two detectors. Examples of other types of misfire detection techniques include ionization detection, torque sensing, acoustic sensing, and in-cylinder pressure monitoring.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. Apparatus for monitoring misfires in an internal combustion engine having a plurality of cylinders, comprising:

a first detector sensing a first combustion-related parameter of said engine and producing a first misfire determination for each individual cylinder event, said first misfire determination having a respective first confidence variable determined according to an instantaneous operating point within an engine operating area;

a second detector sensing a second combustion-related parameter of said engine and producing a second misfire determination for each individual cylinder event, said second misfire determination having a respective second confidence variable determined according to said instantaneous operating point within said engine operating area;

a sensor sensing said instantaneous operating point within said engine operating area; and a fuzzy logic analyzer coupled to said first detector, said second detector, and said sensor, said fuzzy logic analyzer weighing said first and second misfire determinations according to said respective first and second confidence variables to produce first and second weighted misfire determinations, summing said weighted misfire determinations to produce a sum, and comparing said sum to a threshold to produce a final misfire determination.

2. The apparatus of claim 1 wherein said fuzzy logic analyzer compares said sum to a misfire threshold for determining a final misfire determination corresponding to an actual misfire and to a firing threshold for determining a final misfire determination corresponding to an actual proper firing.

3. The apparatus of claim 2 wherein said fuzzy logic analyzer determines a final misfire determination corresponding to a "no call" if said sum is between said misfire threshold and said firing threshold.

4. The apparatus of claim 1 wherein said first and second misfire determinations assume discrete values to indicate a misfire or a proper firing.

5. The apparatus of claim 1 wherein said first and second misfire determinations assume scalar numbers related to a degree of assuredness that a proper firing occurred.

6. The apparatus of claim 1 wherein said first and second misfire determinations have a respective first and second integrity variable associated therewith having a value between 0 and 1, inclusive, determined according to a special condition not reflected in said engine operating point that alters a signal-to-noise ratio of said respective first or second misfire detector, and wherein said fuzzy logic analyzer further weights said first and second misfire determinations according to said respective first and second integrity variables, respectively, when producing said first and second weighted misfire determinations.

7. A method for monitoring misfires in an internal combustion engine having a plurality of cylinders, said method comprising the steps of:

sensing a first combustion-related parameter of said engine to produce a first misfire determination for each individual cylinder event;

sensing a second combustion-related parameter of said engine to produce a second misfire determination for each individual cylinder event;

sensing an instantaneous operating point within an engine operating area;

determining a first confidence variable predetermined according to said sensed instantaneous operating point and the confidence of said first misfire determination at said instantaneous operating point;

determining a second confidence variable predetermined according to said sensed instantaneous operating point and the confidence of said second misfire determination at said instantaneous operating point;

weighing said first and second misfire determinations according to said respective first and second confidence variables to produce first and second weighted misfire determinations;

summing said weighted misfire determinations to produce a sum; and comparing said sum to a threshold to produce a final misfire determination.

8. The method of claim 7 wherein said comparing step comprises the steps of:

comparing said sum to a misfire threshold for determining a final misfire determination corresponding to an actual misfire; and comparing said sum to a firing threshold for determining a final misfire determination corresponding to an actual proper firing.

9. The method of claim 8 wherein a final misfire determination corresponding to a "no call" is made if said sum is between said misfire threshold and said firing threshold.

10. The method of claim 7 further comprising the steps of:

determining a first integrity variable with a value between 0 and 1, inclusive, predetermined according to a first special condition not reflected in said engine operating point that alters a signal-to-noise ratio of said first misfire determination;

determining a second integrity variable with a value between 0 and 1, inclusive, predetermined according to a second special condition not reflected in said engine operating point that alters a signal-to-noise ratio of said second misfire determination; and weighing said first and second misfire determinations according to said first integrity variable and said second integrity variable, respectively, prior to forming said sum.

* * * * *